March 30, 1965   G. N. KLEES   3,176,213
STATIC INVERTER
Filed Dec. 29, 1960   2 Sheets-Sheet 1

INVENTOR.
GEORGE N. KLEES
BY John A. Duffy
AGENT

INVENTOR.
GEORGE N. KLEES
BY John A. Duffy
AGENT

United States Patent Office 3,176,213
Patented Mar. 30, 1965

3,176,213
STATIC INVERTER
George N. Klees, La Habra, Calif., assignor to North American Aviation, Inc.
Filed Dec. 29, 1960, Ser. No. 79,306
3 Claims. (Cl. 321—45)

This invention relates to alternating-current power supplies and more particularly to circuits employing transistors in an inverter circuit to produce precision alternating current from an unregulated direct-current source.

Electrical systems in today's airborne military applications often require alternating current having precision characteristics. Where the primary source of power in a missile, for example, is direct current, a suitable means for converting to alternating current must also be included. The inverter must be capable of producing a considerable amount of alternating-current power from the direct-current source in addition to providing extremely close tolerances in amplitude, frequency, and phase in the output alternating current.

Present day inverters for supplying alternating-current power from a direct-current source are unable to meet the precision design criteria required in military systems. Static inverters in the art which utilize a frequency standard to modulate a direct current, thereby providing a source of alternating current, produce an output alternating current which is dependent in accuracy on the accuracy of the frequency standard. Frequency standards known in the art are unable to maintain tolerances beyond a 3 percent level which is inadequate in precision loads in a missile which often requires an overall accuracy of 1 percent. Additionally, in static inverters in the art wherein a transistor switch is utilized to provide a square wave alternating-current modulated output from a direct current source, the means for converting the square wave to the desired sine wave alternating-current power has included a tuned circuit. The inherent characteristics of the tuned circuit produces considerable phase shift and amplitude deviations Thus, in a three-phase alternating-current supply, wherein in each phase there is included tuned circuit for converting square wave to sine wave, the phase difference between each of the phases may vary considerably in addition to the amplitude to develop an undesirable alternating-current supply.

Accordingly, it is an object of this invention to provide an improved static inverter.

In accordance with the device of this invention, an alternating-current supply system is provided which is responsive to the primary direct-current power supply from an aircraft system to produce precision alternating current. A highly reliable circuit, utilizing transistorized circuitry in a closed loop regulating system provides an alternating-current power suply source which has precision tolerances in amplitude, frequency, and phase.

It is therefore another object of this invention to provide a direct-current to alternating-current inverter for generating an alternating-current power of precision amplitude, frequency, and phase.

It is a further object of this invention to provide a static inverter for producing regulated alternating current from a direct-current source.

It is another object of this invention to provide an electrical inverter circuit responsive to direct-current power for generating alternating current of substantially sine wave and providing means for regulating the alternating current.

It is a further object of this invention to provide an improved means in a static inverter for converting square wave alternating current to sine wave alternating current.

Other objects of invention will become apparent from the following description read in conjunction with the accompanying drawings in which.

Briefly, in accordance with the principal aspect of the invention, a static inverter circuit is provided utilizing transistor switch means responsive to a primary direct-current power source and an alternating-current signal source for producing alternating-current power. The transistor switch produces a square wave alternating-current output which is converted into a sine wave alternating-current power to be supplied to the alternating current load. The transistor is effectively employed as a switching device to alternately open and close at a frequency determined by the signal source to produce a square wave alternating-current output whose amplitude is determined by a primary direct-current source. The sine wave alternating-current output is rectified to produce a direct-current signal proportional to the average of the alternating-current output which is compared in a comparison means with direct current from a voltage reference to obtain a direct-current voltage. The primary direct-current source supplied to the transistor switch is modified in accordance with the direct-current error voltage to provide a regulated alternating-current output.

In accordance with another aspect of the invention, a combinaton of active and passive integrators are provided to convert the square wave alternating-current output to a sine wave with errors in phase and amplitude minimized.

Figure 1:
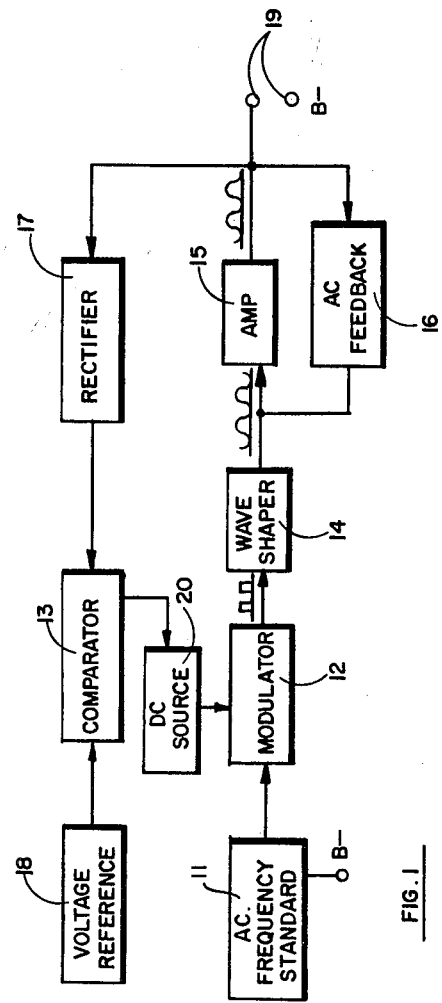
FIG. 1 is a general schematic representation in block form of the principles embodying the invention.

Referring now to the drawing wherein the same part of the invention appearing in more than one figure is designated by the same character, there is illustrated in FIG. 1 a general schematic representation in block form of the principles embodying the invention. In FIG. 1, a direct-current power supply from a source 20 is converted to alternating current by an inverter circuit including a modulator 12. A signal source comprising an alternating-current frequency standard 11 modulates the direct current in the modulator 12 to provide a square wave alternating-current output whose frequency is proportional to the frequency of the standard 11 and whose amplitude is proportional to the amplitude of the direct-current source. A wave shaper 14 converts the square wave to a sine wave alternating current which is amplified as desired by an amplifier 15 to provide alternating-current output at the terminals 19. Alternating-current feedback 16 provides a comparatively large amount of feedback from the output to the input of amplifier 15 to help maintain the sine wave characteristics of the output at terminals 19.

To provide voltage regulation, the alternating-current output at the terminals 19 is rectified by a rectifier 17 which produces a direct-current voltage whose amplitude is proportional to the average voltage of the alternating-current output at the terminals 19. The direct-current output of the rectifier 17 is compared in a comparator 13 with a precision direct-current voltage from a voltage reference 18 to provide a direct-current error signal at the output of comparator 13. The error signal at the output of comparator 13 is connected to modify the amplitude of the direct-current source 20 supplied to the modulator 12.

Precision voltage regulation is obtained by producing an alternating-current output at the terminals 19 which is a function of the voltage reference 18 rather than the frequency of the standard 11. Thus, since the output of the rectifier 17 is an average direct-current voltage equal to the average of the sine wave voltage at the terminals 19 and is therefore proportional to the R.M.S. voltage at the terminals 19, the direct-current error voltage at the output of the comparator 13 is a function of the direct-current output of the rectifier 17 and the voltage reference 18 and also a function of the alternating current at the terminals 19. In this manner, the modulator 12 receives a direct-current error voltage which controls the square wave output in accordance with the voltage reference 18.

Figure 2:
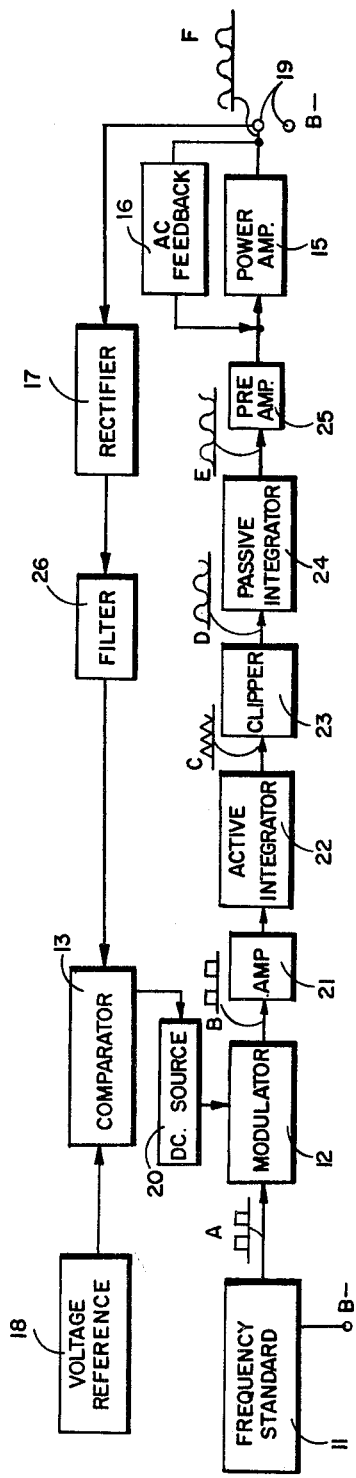
FIG. 2 is a schematic representation in block form of one aspect of applicant's invention.

Referring now to FIG. 2, there is shown a schematic representation in block form of one aspect of applicant's invention. In FIG. 2, the modulator 12 modulates a direct current supplied from the source 20 and modified in accordance with the error voltage from the comparator 13 in accordance with the control from the frequency standard 11. The square wave output of the modulator 12 is amplified by an amplifier 21 whose output is presented to an active integrator 22. The integrator 22 produces a triangular wave alternating-current output which is modified by a clipper 23 to produce a substantial sine wave output. A passive integrator 24 is responsive to the output of the clipper 23 to further complete the process of converting to a sine wave alternating current. A preamplifier 25, responsive to the sine wave output of the integrator 24, amplifies the signal and presents it to a power amplifier 15. The output of the power amplifier 15 at the terminals 19 then is a sine wave alternating-current output which may be applied to an alternating-current load at the terminals 19. The alternating-current feedback 16 allows the power amplifier 15 to greatly amplify the alternating-current signal. The rectifier 17, responsive to the output terminals 19, produces a direct-current signal equal to the average of the alternating-current output of the terminals 19. This signal is filtered by a filter 26 and presented as one input to the comparator 13. The voltage reference 18 provides the other input and the output of comparator 13 is a direct-current error voltage according to the alternating-current output at terminals 19 and the voltage reference 18. The direct-current error voltage modifies the amplitude of the direct-current supply to the modulator 12 from the B+ and B— terminals and therefore regulates the alternating-current output.

In operation of the device of FIG. 2, the frequency standard 11 supplies the modulator 12 with a control signal which may be a square wave as shown by the waveform A. The output of the modulator 12 is also a square wave alternating current, as shown by the waveform B. The amplifier 21 amplifies the square wave and presents it to the active integrator 22, which produces a triangular wave alternating current shown as the waveform C. The clipper 23, responsive to the triangular waveform of C, produces a substantially sine wave alternating current shown as the waveform D. The passive integrator 24, responsive to the waveform D, produces a more perfect sine wave as shown by the waveform E. The waveform E is amplified by the preamplifier 25 and the power amplifier 15 to produce a sine wave alternating-current output at the terminals 19 shown as the waveform F.

The integrators 22 and 24 and clipper 23 in the device of FIG. 2, utilized to convert the square waveform of waveform B to the sine waveform of waveform E, results in a system which minimizes the error in amplitude and phase of the alternating-current sine wave output. Thus, in a three-phase alternating-current supply system which would use three identical systems, as shown in FIG. 2, to provide three-phase alternating-current power, the phase at the output terminals 19 may be made substantially equal to the phase at the output of the frequency standard 11. Therefore, if the frequency standard 11 were to supply three outputs, 120 degrees out of phase, to three systems as shown in FIG. 2, each of the systems at the output terminals 19 would then produce an alternating-current power which is 120 degrees out of phase with each of the others. In this manner, the phase differences are maintained at a minimum. It is to be realized, of course, that the phase at the waveform A is shifted 180 degrees by the integrators 22 and 24 to provide a 180 degree out of phase signal at the terminals 19.

Figure 3:
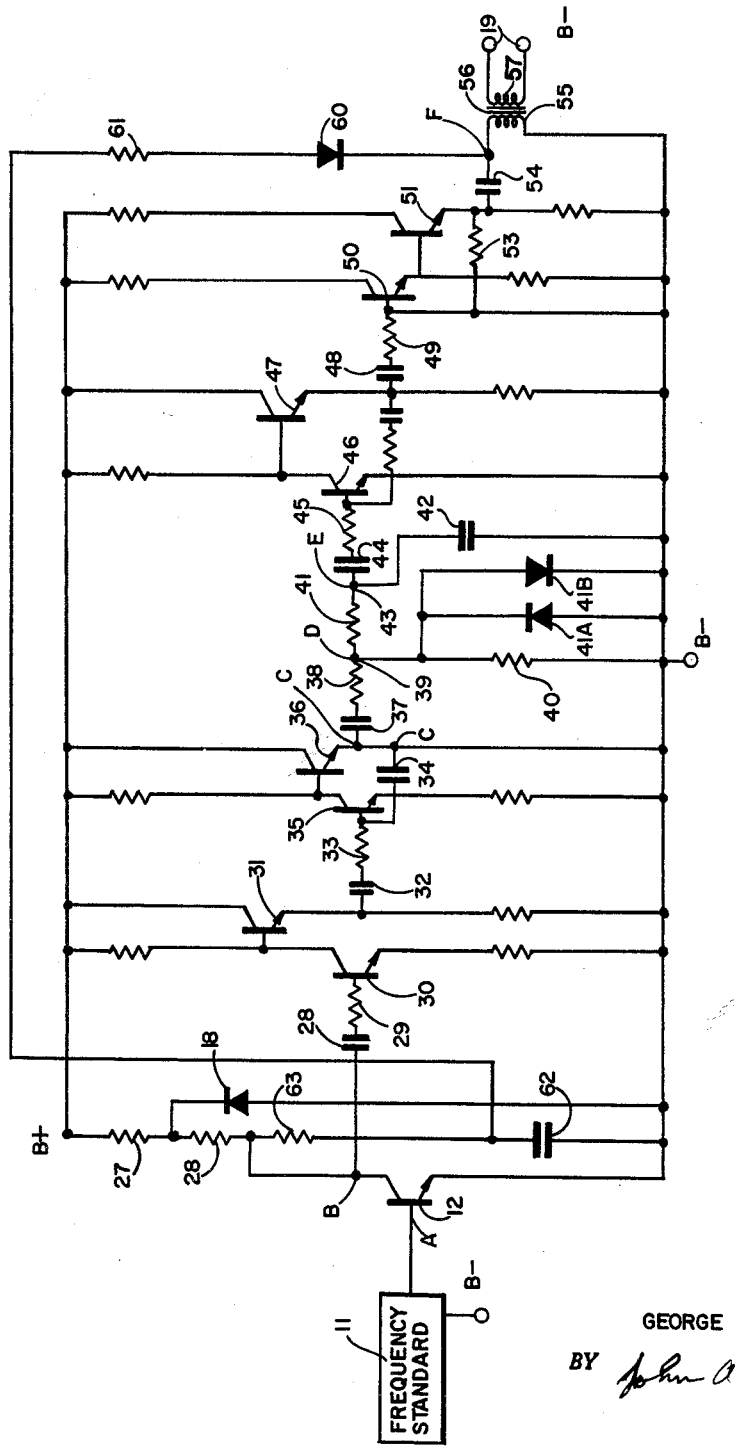
FIG. 3 is a schematic diagram of an electrical circuit illustrating a suitable mechanism of the device of FIG. 2.

Referring now to FIG. 3, there is shown a schematic representation of an electrical circuit illustrating a suitable mechanization of the device of FIG. 2. In FIG. 3, the frequency standard 11 is shown in block form and may be any frequency standard well known in the art which generates square waves of a predetermined desired frequency. The output of the frequency standard 11 is fed to the base of a transistor 12 which acts as the modulator 12 of FIG. 2. Primary direct-current power is supplied to the transistor 12 from a B+ terminal which is connected through resistors 27 and 28 to the collector of the transistor 12 with the emitter of transistor 12 being connected to the B— terminal. The output of the transistor 12 is coupled through a capacitor 28 and a resistor 29 to the base of a transistor 30. The transistor 30 has its collector presented to the base of a transistor 31 which acts as an emitter follower to comprise the amplifier 21 of FIG. 2. The output at the emitter of the transistor 31 is coupled through a capacitor 32 and a resistor 33 to the base of a transistor 35. The transistor 35 and an emitter-follower transistor 36 operate as the active integrator 22 of the device of FIG. 2, integrating the signal presented to the base of the transistor 35 and providing a triangular waveform alternating-current output at the emitter of the transistor 36. A capacitor 34 couples the emitter of the transistor 36 to the base of the transistor 35 to provide proper feedback. A capacitor 37 and a resistor 38 couple the triangular wave output of the transistor 36 to a point 39 which is connected through a resistor 40 and a pair of diodes 41A and 41B functioning as the clipper 23 of the device of FIG. 2. The diodes 41A and 41B clamp the positive and negative half cycles of the triangular wave output from the transistor 36 to provide at the point 39, a clipped triangular waveform which is substantially a sine wave alternating current. The alternating current from point 39 is integrated by a passive integrator comprising the resistor 41 and the capacitor 42 which provide at a point 43 a sine wave alternating-current form. The sine wave at the point 43 is coupled through a capacitor 44 and a resistor 45 to the base of a transistor 46, which along with an emitter-follower transistor 47 operates as the preamplifier 25 of the device of FIG. 2. The output of transistor 47 at its emitter is coupled through a capacitor 48 and resistor 49 to the base of a transistor 50, which along with an emitter-follower transistor 51, operates at the power amplifier 15 of the device in FIG. 2. A resistor 53, coupling the emitter of the transistor 51 to the base of the transistor 50, provides an alternating-current feedback to produce at the output of the transistor 51 a high gain sine wave alternating-current signal which is coupled through a capacitor 54 to the primary winding 55 of an output transformer 56. A secondary winding 57 may be connected to provide alternating current to a load at the terminals 19.

The sine wave alternating-current output of the transistor 51, coupled through the capacitor 54, is rectified by a circuit including the diode 60 to produce a direct-current signal which is equal to the average sine wave alternating-current output of the transistor 51 terminal coupled from the capacitor 54. The direct-current voltage from the diode 60 is connected through a limiting resistor 61 to a filter comprising a capacitor 62 to one end of a resistor 63. The resistors 28 and 63 comprise the comparator 13 of the device of FIG. 2, comparing the signal from the rectifier 60 presented at the one end of the resistor 28 with the voltage of the reference 18. The common connection of the resistors 28 and 63, which is connected to the collector of the transistor 12, is the output of the comparator 13. The amplitude of the direct-current power supplied to the collector of the transistor 12 is therefore modified in accordance with the output of the comparator 13 provided at the common connections of the resistors 28 and 63. In this manner, regulation of the alternating-current output, according to the voltage reference 18 is achieved.

In the circuit of FIG. 3, the output waveforms A, B, C, D, E, and F are illustrated in accordance with the waveforms as shown in the schematic diagram of FIG. 2. Thus, in FIG. 3, waveform A is a square wave as is the modulated alternating-current waveform B. The output at the emitter of transistor 36 is a triangular waveform C with the waveform D at the point 39 being a substantial sine wave having been clipped by the clipper 23, including the diodes 41A and 41B. The waveform E at the point 43 is then a substantial sine wave being at the output of the passive integrator 24, including the resistor 41 and the capacitor 42. The output of the transistor 51 coupled through capacitor 54 is the waveform F.

The alternating current at the terminals 19 is 180 degrees out of phase with the control signal from the frequency standard 11, due to the double integration of the active integrator 22 and passive integrator 24. In this manner, if three circuits substantially identical to that shown in FIG. 3 are controlled by three outputs of a frequency standard which are 120 degrees out of phase with each other, the three outputs at terminals 19 for each of the devices will then be 120 degrees out of phase with each other in accordance with the 180 degree phase shift in each of the devices. In this manner, a proper phase relationship may be obtained in a three-phase alternating-current supply system.

The conversion of the square wave output of the modulator 12 to a sine wave by the integrators 22 and 24 and the clipper 23 provides a sine wave in which amplitude and phase shift changes have been minimized. Thus, the disadvantages of prior art tuned circuits for converting square wave to sine wave have been avoided by the use of the active integrator, the clipper, and the passive integrator. In this manner, phase relationship between the phase at the output terminals 19 may be closely controlled in relation to the phases of other outputs.

The device of applicant's invention, as shown in the embodiment of FIG. 3 and illustrated in the diagrams of FIG. 1 and FIG. 2, is particularly applicable in a guided missile system in which highly precision alternating current is supplied to a motor winding of a gyroscope. By regulating the alternating-current output in accordance with the precision voltage reference 18, instead of the slightly inaccurate frequency standard 11, the amplitude of the voltage output may be controlled to a high degree. Also, by utilizing the means illustrated for converting the square wave output of the modulator to the sine wave output, a precision relationship may be obtained which is highly desirable in a three-phase alternating-current supply in which varying phase shifts between the individual phases results in excessive current in the winding to produce substantial errors. Thus, the amplitude of the output sine wave at the terminals 19 may be controlled to a tolerance dependent only upon the precision of the voltage reference 18, and the phase angle remains fixed in accordance with the phase angle of the frequency standard 11.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In combination:
   a source of direct current power;
   an alternating current signal source;
   a modulator connected to said source of direct current power and to said signal source to modulate the power from said power source in synchronism with said signal source to produce a square wave signal;
   a first integrator connected to integrate said square wave signal to generate a triangular wave signal in synchronism with said square wave signal;
   a clipper connected to convert said triangular wave signal to a substantially sine wave alternating signal;
   a second integrator connected to convert said substantially sine wave alternating signal to a sine wave alternating signal;
   a power amplifier connected to amplify said sine wave alternating signal;
   a rectifier connected to produce a direct current signal proportional to the average voltage of said amplifier alternating signal;
   a filter connected to filter said direct current signal;
   a direct current reference voltage source;
   a comparator connected to compare said filtered direct-current signal and said reference voltage to obtain a direct current error voltage;
   a modifier connected to modify said direct current power from said source in accordance with said direct current error voltage.

2. A static inverter comprising a transistor switch connected to be responsive at its base to a source of alternating-current control signals and having its output electrodes responsively connected across a primary source of direct-current power, the output of said transistor switch at one of its output electrodes being a square wave alternating current whose frequency is proportional to the frequency of said source of control signals and whose amplitude is proportional to the amplitude of said primary direct-current source, a transistor integrator responsive to the output of said transistor switch to provide a triangular wave alternating current, a clipper responsive to the output of said transistor integrator means for providing a substantially sine wave alternating current, a resistor capacitor integrator responsive to the output of said clipper for providing a sine wave alternating current 180 degrees out of phase with the output of said transistor switch, an amplifier connected to amplify the sine wave alternating current provided at the output of said resistor-capacitor integrator, a rectifier responsive to the output of said amplifier for producing a direct-current voltage proportional to the average voltage of the alternating current at the output of said amplifier, a source of reference direct-current voltage, a comparator responsive to said reference voltage and said average voltage at the output of said rectifier for producing a direct-current error voltage, and means for modifying the amplitude of said primary source of direct current according to said direct-current error voltage to regulate the alternating curent at the output of said amplifier.

3. The combination recited in claim 2 wherein said comparator comprises a first and a second resistor, one end of said resistors connected in common to one of the output electrodes of said transistor switch, the other end of said first resistor connected to receive a voltage proportional to said reference voltage, and the other end of said second resistor connected to receive a voltage proportional to said average voltage.

(References on following page)

References Cited by the Examiner
UNITED STATES PATENTS

| | | | |
|---|---|---|---|
| 2,163,670 | 6/39 | Ditcham | 332—37 |
| 2,644,925 | 7/53 | Koros | 332—31 |
| 2,740,055 | 3/56 | Ziniuk | 321—2 |
| 2,864,052 | 12/58 | Searcy | 321—18 |
| 2,881,332 | 4/59 | Jensen | 307—88.5 |
| 2,935,682 | 5/60 | Gates | 324—68 |
| 2,956,243 | 10/60 | Weinschel | 332—38 |
| 2,959,725 | 11/60 | Younkin | 321—18 |
| 2,965,857 | 12/60 | Bettin et al. | 332—38 |

LLOYD McCOLLUM, *Primary Examiner.*